US012276571B2

(12) United States Patent
Sotgiu

(10) Patent No.: US 12,276,571 B2
(45) Date of Patent: Apr. 15, 2025

(54) METHOD AND APPARATUS FOR DETERMINING THE GEOMETRICAL DIMENSIONS OF A VEHICLE WHEEL MOUNTED THAT ROTATES ABOUT AN AXIS OF ROTATION

(71) Applicant: Snap-on Equipment Srl a unico socio, Correggio (IT)

(72) Inventor: Paolo Sotgiu, Modena (IT)

(73) Assignee: Snap-on Equipment Srl a unico socio, Correggio (IT)

( * ) Notice: Subject to any disclaimer, the term of this patent is extended or adjusted under 35 U.S.C. 154(b) by 343 days.

(21) Appl. No.: 17/866,027

(22) Filed: Jul. 15, 2022

(65) Prior Publication Data

US 2023/0014682 A1 Jan. 19, 2023

(30) Foreign Application Priority Data

Jul. 16, 2021 (IT) .................... 102021000018716

(51) Int. Cl.
*G01M 17/02* (2006.01)
*B60C 25/05* (2006.01)
*G01B 15/04* (2006.01)

(52) U.S. Cl.
CPC ......... *G01M 17/02* (2013.01); *B60C 25/0548* (2013.01); *G01B 15/04* (2013.01)

(58) Field of Classification Search
None
See application file for complete search history.

(56) References Cited

U.S. PATENT DOCUMENTS

| 2002/0100321 A1 | 8/2002 | Douglas et al. |
| 2004/0165180 A1 | 8/2004 | Voeller et al. |
| 2005/0165509 A1 | 7/2005 | Braghiroli |
| 2008/0119962 A1 | 5/2008 | Voeller et al. |
| 2023/0182509 A1* | 6/2023 | Prabhakara ............ G06V 20/64 73/146 |

FOREIGN PATENT DOCUMENTS

| DE | 10 2015 010 953 A1 | 3/2017 | |
| EP | 1 398 610 A1 | 3/2004 | |
| EP | 2 741 066 A1 | 6/2014 | |
| EP | 3 059 546 A1 | 8/2016 | |
| WO | 00/14503 A1 | 3/2000 | |
| WO | WO-03089876 A1 * | 10/2003 | ........... G01B 11/275 |
| WO | 2016/042445 A1 | 3/2016 | |

OTHER PUBLICATIONS

The extended European search report issued by the European Patent Office on Dec. 12, 2022, which corresponds to European Patent Application No. 22185314.6-1001 and is related to U.S. Appl. No. 17/866,027.

* cited by examiner

*Primary Examiner* — Son T Le
*Assistant Examiner* — Jermaine L Jenkins
(74) *Attorney, Agent, or Firm* — Studebaker Brackett PLLC

(57) ABSTRACT

Method and related apparatus for determining the geometrical dimensions of a wheel, or at least one part of a wheel, with particular reference to vehicle wheels, in the context of a wheel maintenance process. This method uses contactless sensors which comprise a scanning radar system, preferably a millimeter-wave radar system, to scan the wheel, or at least one part of the wheel, quickly and accurately.

15 Claims, 2 Drawing Sheets

METHOD AND APPARATUS FOR DETERMINING THE GEOMETRICAL DIMENSIONS OF A VEHICLE WHEEL MOUNTED THAT ROTATES ABOUT AN AXIS OF ROTATION

FIELD OF THE INVENTION

The present invention relates to a method for determining the geometrical dimensions of a wheel, or at least one part of a wheel, with particular reference to vehicle wheels, in the context of a wheel maintenance process. The present invention also relates to an apparatus for implementing the abovementioned method.

PRIOR ART

The wheels of vehicles are generally composed of a rim and a tire mounted on it.

During wheel maintenance operations, for example operations involving mounting the tire on the rim or demounting the tire from the rim, or wheel balancing operations, as well as on vehicle brake testers, it is often advantageous to determine the geometrical dimensions of the wheel, or at least a portion of the wheel.

Over time, various solutions have been disclosed in this regard.

For example, EP 1 398 610 A1 discloses a method, and a related apparatus, which make use of optical sensors to determine the dimensions of a vehicle wheel mounted such that it can rotate about an axis of rotation and, in particular, to determine any problems in terms of runout.

EP 3 059 546 A1 discloses a method, and a related apparatus, for determining runout of a vehicle wheel, which uses an optical sensor configured to light up a linear portion of the tread of a tire, said linear portion having an axial width which is smaller than the axial width of the tread.

US 2004/0165180 A1 and US 2008/0119962 A1 respectively disclose a wheel balancer and a tire changer which use optical sensors to determine distances, dimensions and characteristics of vehicle wheels.

US 2002/0100321 A1 discloses a wheel balancer having mechanical arm-pieces for checking that the wheel is centered.

WO 2016/042445 A1 discloses a tire changer having a distance sensor for detecting the profile of a wheel. The distance sensor may be an optical or ultrasonic sensor.

However, the known solutions have drawbacks. Specifically, various types of sensor are used to determine the geometrical dimensions of a wheel.

Mechanical sensors involve physical contact between the sensor and the wheel to be analyzed and therefore tend to be less accurate and make the wheel maintenance process extremely slow.

The performance of sensors based on sound waves (for example ultrasonic sensors) is generally limited by the speed at which the sound waves travel through the air. Therefore, scanning cannot take place too quickly, otherwise the sensor may be unable to correctly analyze the wheel or wheel portion. Likewise, when this type of sensor is used for determining wheel runout, or for verifying that the wheel is centered, the slowness does not allow a high number of samples to be obtained per revolution of the wheel.

Even optical sensors (typically laser sensors) pose problems. This type of sensor is theoretically much faster than sensors based on sound waves, being in theory limited by the speed of light. However, even without taking account of the times necessary to process the signal, these sensors are sensitive to environmental conditions and therefore need a certain exposure time. In general, adverse environmental conditions and particular types of material being scanned can cause delays or scanning errors in optical sensors.

OBJECT OF THE INVENTION

The Applicant therefore aims to overcome the limitations and problems encountered with known solutions.

It is thus an aim of the invention to propose a method, and a related apparatus, that can determine the geometrical dimensions of a wheel, or at least one part of a wheel, with particular reference to vehicle wheels, in the context of a wheel maintenance process, wherein the wheel is mounted such that it can rotate about an axis of rotation, which makes it possible to scan the wheel, or part of the wheel, quickly and accurately.

The present invention also aims to provide a method, and a related apparatus, for scanning a wheel or a part thereof, in the context of a wheel maintenance process, correctly and without errors due, for example, to the characteristics of the sensor used, in relation to the speed at which scanning is performed and/or to the environmental conditions.

The present invention also aims to provide a method, and a related apparatus, for scanning a wheel or a part thereof, in the context of a wheel maintenance process, which makes it possible to obtain a high number of samples, or scans, per unit time, for example with reference to a complete revolution of the wheel about an axis of rotation.

The present invention also aims to provide a method, and a related apparatus, for scanning a wheel or a part thereof, in the context of a wheel maintenance process, which reduces the time taken to process the scanning signal.

The present invention also aims to provide a method, and a related apparatus, for scanning a wheel or a part thereof, in the context of a wheel maintenance process, which reduces or eliminates sensor exposure times.

The present invention also aims to provide a method, and a related apparatus, for scanning a wheel or a part thereof, in the context of a wheel maintenance process, which is reliable, robust and inexpensive.

These and other aims of the present invention will be obvious to those skilled in the art from reading the present detailed description and from the attached illustrative drawings.

SUMMARY OF THE INVENTION

The Applicant has found that these and further aims are achieved by a method for determining the geometrical dimensions of a wheel, in particular a vehicle wheel, or at least one part of a wheel, mounted such that it can rotate about an axis of rotation, comprising the steps of scanning, contactlessly, a plurality of measurement points on the wheel, which is rotating, and of measuring the distances of the plurality of measurement points on the wheel with respect to a reference position. The method of the present invention further comprises the steps of measuring the angular positions of the plurality of measurement points with respect to the axis of rotation of the wheel and subsequently determining the position of the plurality of points of the wheel, or of the at least one part of the wheel, with respect to the axis of rotation of the wheel, on the basis of the respective distances with respect to the reference position and of the respective angular positions with respect to the axis of rotation. The method of the present invention is characterized in that the step of contactless scanning involves the use of at least one sensor device comprising a radar system.

According to one embodiment, the radar system operates at frequencies between 300 MHz and 300 GHz.

According to one embodiment, the radar system is a millimeter-wave radar system and operates at frequencies between 30 GHz and 300 GHz. According to a preferred embodiment, the millimeter-wave radar system operates at frequencies between 76 GHz and 81 GHz.

According to one embodiment, on the basis of the position of the plurality of points of the wheel or of the at least one part of the wheel, with respect to the axis of rotation of the wheel, the position, in particular the runout and/or the angle of inclination, of the central axis (or geometric axis) of the wheel, with respect to the axis of rotation, is determined.

According to one embodiment, on the basis of the position of the plurality of points of the wheel or of the at least one part of the wheel, with respect to the axis of rotation of the wheel, the presence of any centering defects and/or radial and/or lateral wobble is determined.

According to one embodiment, at least some of the plurality of measurement points are scanned on an internal side of the wheel and/or on an external side of the wheel and/or on a circumferential edge of the wheel, the latter being understood as meaning a wheel bearing a tire or a wheel/rim assembly, in which case the circumferential edge of the wheel may be understood as referring to either the circumferential edge of the rim or the circumferential edge of the tire, or indeed just a rim, in which case the circumferential edge of the wheel is understood as meaning the circumferential edge of the rim.

The present invention also relates to an apparatus for determining the geometrical dimensions of a wheel, in particular a vehicle wheel, or at least one part of a wheel, mounted such that it can rotate about an axis of rotation, comprising at least one contactless sensor device that can measure the distance of a plurality of measurement points being scanned on the wheel with respect to a reference position.

The apparatus according to the present invention further comprises a rotation sensor for determining the respective angular positions of the plurality of measurement points being scanned during the rotation of the wheel about the axis of rotation, and an evaluation device, connected to the at least one contactless sensor device and to the rotation sensor, that can determine the position of the plurality of points, with respect to the axis of rotation, on the basis of the respective distances with respect to the reference position and of the respective angular positions with respect to the axis of rotation. The apparatus of the present invention is characterized in that the at least one sensor device comprises a radar system.

According to one embodiment, the radar system of the apparatus operates at frequencies between 300 MHz and 300 GHz.

According to one embodiment, this radar system is a millimeter-wave radar system and operates at frequencies between 30 GHz and 300 GHz. According to a preferred embodiment, the millimeter-wave radar system operates at frequencies between 76 GHz and 81 GHz.

In one embodiment, the apparatus according to the present invention comprises a plurality of contactless sensor devices. In a preferred embodiment, the apparatus of the present invention comprises at least three contactless sensor devices, respectively facing an internal side of the wheel, an external side of the wheel and a circumferential edge of the wheel.

According to one embodiment, the apparatus of the present invention forms part of a tire changer.

According to one embodiment, the apparatus of the present invention forms part of a wheel balancer.

According to one embodiment, the apparatus of the present invention forms part of a vehicle brake tester.

According to one aspect, the contactless sensor device may be rigidly secured to a wheel protection device (also known as a wheel guard) of a wheel balancer, which is generally arranged so as to rotate about an axis parallel to the axis of rotation of the wheel, or, according to certain embodiments, it is designed to slide or pivot/slide ("space-saving" solutions). In a preferred embodiment, the contactless sensor device of the present invention can obtain a scan of the profile of the sidewall of the wheel as the wheel guard moves.

According to one aspect, the contactless sensor device can automatically acquire the width of the rim or of the tire-bearing wheel.

According to one aspect, the contactless sensor device of the present invention may be used to obtain information on the runout of the wheel and/or to check that the wheel mounted on the shaft of the wheel maintenance machine is centered.

Preferably, the contactless sensor device of the present invention may be used to count the spokes of the rim of the wheel undergoing maintenance.

BRIEF DESCRIPTION OF THE DRAWINGS

A detailed description of the present invention will be provided hereinbelow with reference to the attached drawings which are provided solely by way of non-limiting example and in which.

DETAILED DESCRIPTION OF PREFERRED EMBODIMENTS OF THE INVENTION

Figure 1:
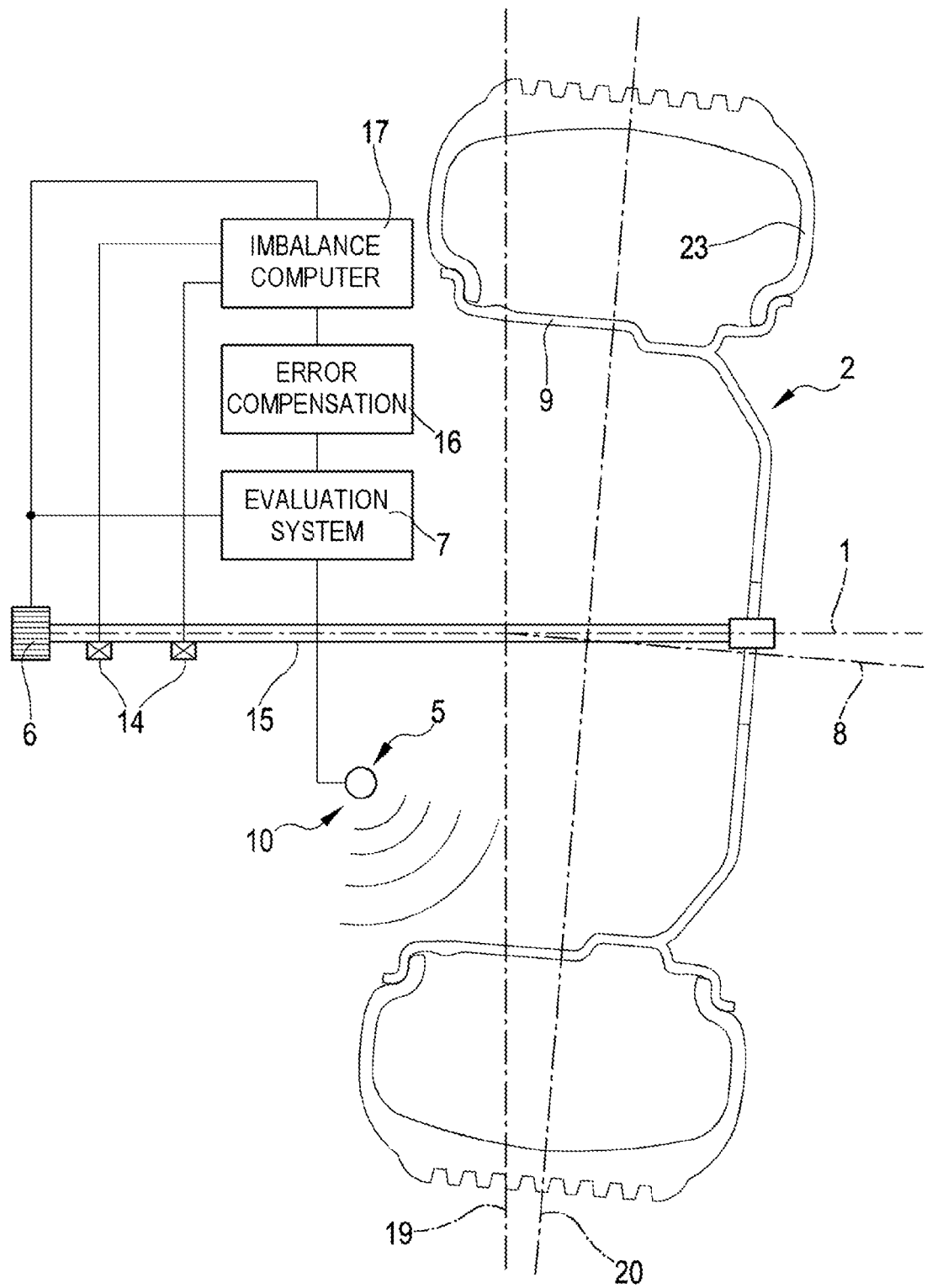
FIG. 1 schematically shows a first embodiment of the invention.

In the description below, any expressions used, such as "right-hand", "left-hand", "above", "below", "upper", "lower", "horizontal", "vertical" and the like, are used merely for illustrative purposes and refer to the particular arrangement of the elements present in the attached figures and therefore are not limiting in any way.

With reference to the attached figures, a motor vehicle wheel 2 is secured to a main shaft 15 which is supported such that it can rotate about the axis of rotation 1 on the frame structure of a wheel maintenance machine, for example a wheel balancer (not shown), in a known manner, for example as shown in the published patent WO 00/14503 A1.

During a wheel balancing check, the motor vehicle wheel 2 is rotated about the axis of rotation 1 and the forces which result from an imbalance of the wheel are measured by means of force measurement sensors 14 and are evaluated in an imbalance evaluation device 17. The evaluation process includes calculation of the imbalance parameters in terms of balancing weight and angular positions of rotation. The balancing weights are then attached to the wheel in a known manner in the form of balancing weight pieces at the angular positions of rotation calculated to compensate for the imbalance of the wheel.

When the motor vehicle wheel 2 is secured to the main shaft 1 using conventional clamping means, the central axis or geometric axis 8 of the wheel often does not exactly coincide with the axis of rotation 1. This results in imbalance measurements which are false in relation to the imbalance of the wheel.

In the embodiments shown, the exact position of the motor vehicle wheel 2 with respect to the axis of rotation 1 and therefore the position of the geometric axis 8 of the wheel with respect to the axis of rotation 1 may be determined.

In the figures, for clarification, the geometric axis 8 of the wheel is shown in an exaggeratedly eccentric arrangement with a particularly obvious angle of inclination with respect to the axis of rotation 1 of the main shaft 15.

The embodiments shown involve the use of a scanning radar system, preferably a millimeter-wave (mmWave) radar system.

The term millimeter-wave refers to the spectrum of radio waves with frequencies between 30 and 300 GHz, or with a wavelength ranging between 1 and 10 millimeters.

Preferably, the radar system of the present invention operates at frequencies between 76 and 81 GHz, corresponding to a wavelength of around 4 mm.

A complete mmWave radar system comprises radiofrequency (RF) transmitter (Tx) and receiver (Rx) components, analog components, such as a clock oscillator and digital components, such as analog/digital convertors (ADC), microcontrollers (MCU) and digital signal processors (DSP).

These components, including the antenna, may be miniaturized and incorporated in a single chip, and are available from a number of manufacturers; for example, see the families of mmWave sensors under the names IWRx and AWRx supplied by the company Texas Instruments Incorporated.

Such a radar system may be incorporated in at least one, or more, contactless sensor devices 10, 11, 12. By virtue of the millimeter-wave propagation characteristics, the sensor devices 10, 11, 12 use the electromagnetic waves reflected by objects in their path to determine the position, speed and distance of those objects.

These sensors may therefore be used to determine the full geometric shapes of the wheel or of only part of the wheel.

Figure 2:
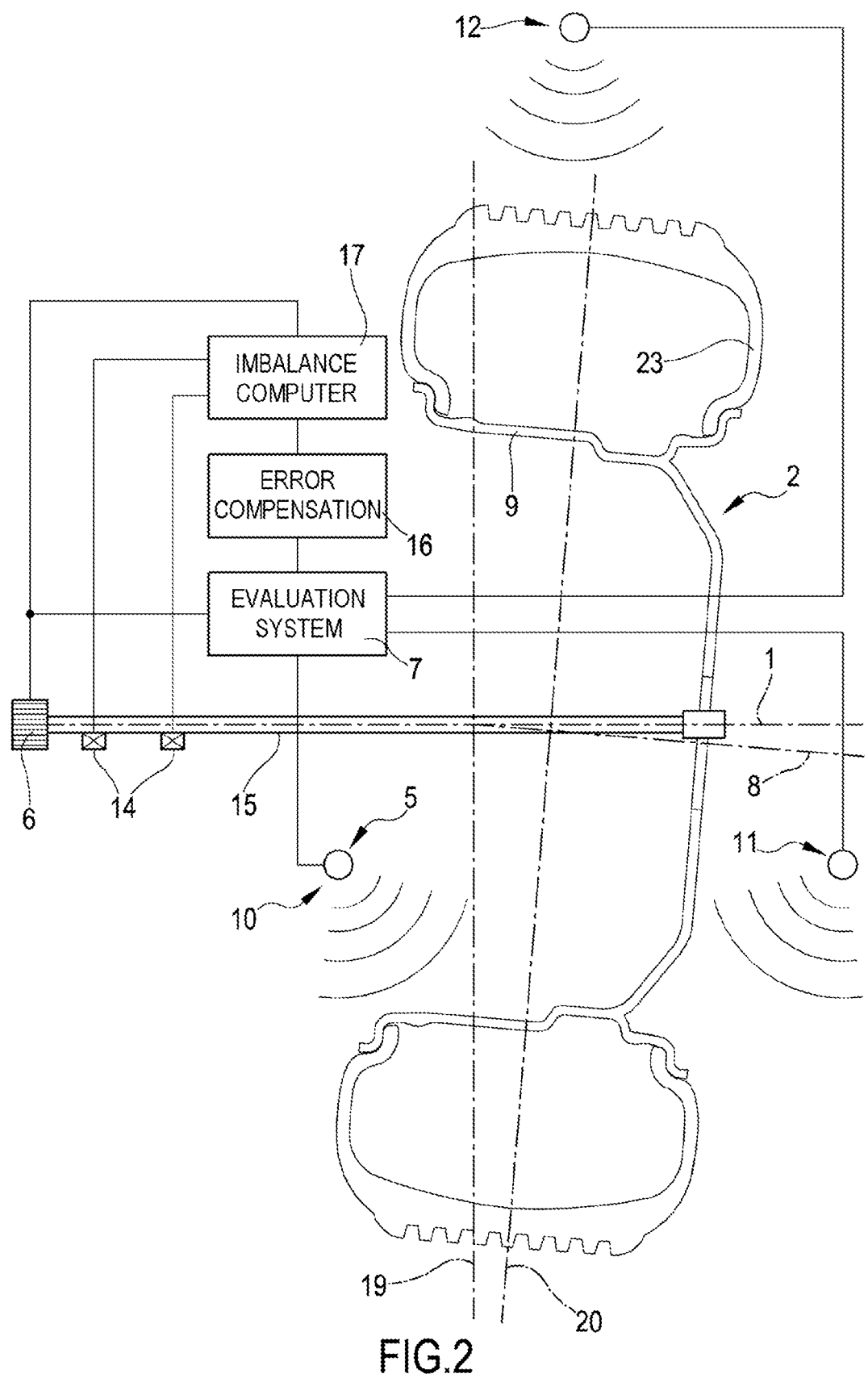
FIG. 2 schematically shows a second embodiment of the invention.

In the embodiments shown in FIGS. 1 and 2, and with specific, but absolutely non-limiting, reference to the determination of runout, centering defects and/or wobble, the position of the motor vehicle wheel 2 is determined with respect to the axis of rotation 1 by means of a process which involves scanning a plurality of measurement points arranged on at least two peripheries around the axis of rotation 1.

These peripheries lie in planes 19, 20 which are perpendicular to the axis of rotation 1 on a part of the wheel, preferably on the rim 9 of the wheel.

To activate the position measurement process, the distances of two measurement points which lie in two planes 19 and 20 on at least two of these peripheries are determined relative to a reference position 5 on the machine.

This reference position 5 is fixed and may for example, but not necessarily, coincide with the position of one of the sensor devices 10, 11 or 12, or be located on any other point on the frame structure of the wheel maintenance machine.

In the embodiment of FIG. 1, the scan focuses on the measurement points in the plane 19. The motor vehicle wheel 2 which is clamped on the main shaft 15 is rotated in such a way that a given number of measurement points which are converted, for example, into distance signals, are provided on the periphery of the part of the wheel scanned.

After (or possibly at the same time as) the operation for measuring the distances of the measurement points which lie in the plane 19, the scan focuses on the peripheral part of the wheel (at the rim 9 of the wheel) in the plane 20. The distances of the measurement points which lie on the periphery of this part of the wheel are also measured in said plane, as stated above, while the wheel is rotating.

The planes 19 and 20 are substantially perpendicular to the axis of rotation 1 and may be arranged in such a way that the measurement points lie on a corresponding internal periphery of the rim 9 of the wheel. The at least two planes 19 and 20 may be arranged such that they intersect surface portions of the wheel rim 9 which extend substantially parallel to the axis of rotation 1. With reference to the attached figures, this is the case for example of the plane 19. Alternatively, again with reference to the attached figures, the respective plane may be arranged such that it intersects a part of the rim which extends in an inclined direction or substantially perpendicular to the axis of rotation 1, as in the case of the plane 20.

The reference position 5 is arranged in a fixed position on the frame structure of the machine. The sensor device 10, and any other sensor devices 11 and 12 where present, are positioned at known distances from the reference position 5.

Since the distances between the reference position 5 and the sensor devices 10, 11 and 12 are always known, it is possible to ensure that the sensor devices may in turn be fixed with respect to the structure of the frame of the machine, or be movable, for example may be designed to rotate about a pin, slide along a straight guide, or pivot/slide.

The respective angular positions of the measurement points are determined by means of a rotation sensor 6, for example by means of an encoder.

The rotation sensor 6 and the one or more sensor devices 10, 11, 12 are connected to an electronic evaluation system or device 7 in order to determine the respective angular positions of rotation of the measurement points which are being scanned.

The evaluation device 7 includes a computer which, on the basis of the distance measurement values in relation to the respective measurement points and the associated angle of rotation measurement values from the rotation sensor 6, calculates the position of the measurement points arranged on an internal surface of the rim 9 of the wheel in the two planes 19 and 20 with respect to the axis of rotation 1.

The position of the motor vehicle wheel 2 with respect to the axis of rotation 1 may be derived directly from these measurements. This information may include a runout and/or inclined position of the geometric axis 8 of the wheel with respect to the axis of rotation 1, which causes an error in the measurement values relating to the imbalance of the wheel that are verified by means of the force measurement sensor 14.

The deviations in the position of the geometric axis 8 of the wheel with respect to the axis of rotation 1, in other words the exact position of the wheel 2 with respect to the axis of rotation 1, may be supplied, as correction values, to an error compensation device 16. The error compensation device 16 duly corrects the balance parameters (balancing weight and angular position) which are calculated in the imbalance evaluation device 17.

In the embodiment of FIG. 1, distance is measured in the area of the internal peripheral surface of the internal part of the rim of the wheel. However, it is also possible to measure the distances in the area of the internal peripheral surface of the external part of the rim, by means of a sensor device 11; see FIG. 2, for example.

Naturally, it is possible to evaluate the distance values by means of both sensor devices 10 and 11. For this purpose, both sensor devices 10, 11 are connected to the electronic evaluation system 7.

Alternatively, it is possible to equip the wheel maintenance machine with a single sensor device 11, thus arranged to perform the scan in the area of the internal peripheral surface of the external part of the rim, to perform substantially the same process shown in relation to FIG. 1, i.e. in relation to the single sensor device 10.

Furthermore, although not shown directly in the figures, it is possible to use the single sensor device 10 or the single sensor device 11, or both sensor devices 10 and 11, to scan the complete profile of the rim 9 of the wheel, or to scan some parts of the rim, for example to scan the shape and dimensions of the internal surfaces thereof, or possibly also of the external surfaces, in the case where the tire is not present, and it is likewise possible to scan the channel, edges and portions of the central disk, for example the spokes, both the surfaces arranged in the internal part (for example by means of the sensor device 10) and those arranged in the external part (for example by means of the sensor device 11).

Where the spokes of the rim are scanned, it is also possible to provide the electronic evaluation system 7 with the relevant functionalities for counting the spokes, optionally to allow mounting of the balancing weight pieces in positions where they are concealed by the spokes, so as not to modify the overall look of the rim.

Furthermore, it is also possible to use the sensor devices 10, 11 to scan the tire 23 of the wheel, for example as regards geometric irregularities, such as wobble or radial centering defects. To this end, is possible to provide a further sensor device 12, also connected to the electronic evaluation system 7, which may be directly on the surface of the tread of the tire 23.

The sensor device 12 may be mounted fixed with respect to the structure of the frame of the machine, or may be mounted movably, for example may rotate, slide or pivot/slide.

The sensor device 12 may thus be arranged in such a way as to easily scan both the tread and, for example, the sidewalls (both the internal sidewall and the external sidewall) of the tire.

According to one possible embodiment, the wheel maintenance machine, for example a wheel balancer or a tire changer (not shown in the figures), has the single sensor device 12 for scanning the surface of the tread of the tire 23 and/or possibly a portion of the sidewalls of the tire adjacent to the tread, but does not have one or both of the sensor devices 10 and 11 for scanning the rim.

When the tire is scanned, it is also possible to equip the electronic evaluation system 7 with a special feature for determining the state of wear of said tire.

When the tire 23 is being scanned, in particular when the wheel is rotating, with varying degrees of inflation of the tire, it is possible to identify anomalies in the tire, in particular as regards differences in rigidity of the tire, by means of the distance measurements in relation to the measurement points on different peripheries of the lateral walls of the tire and/or on the surface of the tread.

The present invention thus provides a method and an apparatus for the full diagnosis of the wheel of a motor vehicle by means of an efficient contactless scanning technique.

LIST OF REFERENCES 1 axis of rotation of the wheel
2 vehicle wheel
5 reference position
6 rotation sensor
7 electronic evaluation system or device
8 geometric axis or central axis of the wheel
9 rim of the wheel
10, 11, 12 contactless sensor device
14 force measurement sensors
15 main shaft
16 error compensation device
17 imbalance evaluation device
19, 20 planes perpendicular to the axis of rotation 1
23 tire

The invention claimed is:

1. A method for determining the geometrical dimensions of a wheel, in particular a vehicle wheel, or at least one part of a wheel, the method comprising the steps of:
providing a wheel maintenance machine having a main shaft and a frame structure supporting the main shaft;
securing the wheel to the main shaft of the wheel maintenance machine using clamping means such that the wheel rotates about an axis of rotation;
scanning, contactlessly, a plurality of measurement points on the wheel while the wheel is rotating;
measuring the distances of the plurality of measurement points on the wheel with respect to a reference position;
measuring the angular positions of the plurality of measurement points with respect to the axis of rotation of the wheel; and subsequently
determining the position of the plurality of points of the wheel, or of the at least one part of the wheel, with respect to the axis of rotation of the wheel, on the basis of the respective distances with respect to the reference position and of the respective angular positions with respect to the axis of rotation,
wherein the step of contactless scanning involves the use of at least one sensor device comprising a radar system.

2. The method as claimed in claim 1, wherein the radar system operates at frequencies between 300 MHz and 300 GHz.

3. The method as claimed in claim 2, wherein the radar system is a millimeter-wave radar system and operates at frequencies between 30 GHz and 300 GHz.

4. The method as claimed in claim 3, wherein the radar system operates at frequencies between 76 GHz and 81 GHz.

5. The method as claimed in claim 1, wherein on the basis of the position of the plurality of points of the wheel or of the at least one part of the wheel, with respect to the axis of rotation of the wheel, the position, in particular the runout and/or the angle of inclination, of the central axis of the wheel, with respect to the axis of rotation, is determined.

6. The method as claimed in claim 1, wherein on the basis of the position of the plurality of points of the wheel or of the at least one part of the wheel, with respect to the axis of rotation of the wheel, the presence of any centering defects and/or radial and/or lateral wobble is determined.

7. The method as claimed in claim 1, wherein at least some of the plurality of measurement points are scanned on an internal side of the wheel and/or on an external side of the wheel and/or on a circumferential edge of the wheel.

8. An apparatus for determining the geometrical dimensions of a wheel, in particular a vehicle wheel, or at least one part of a wheel, wherein the apparatus is a wheel maintenance machine, the apparatus comprising:

a main shaft supported by a frame structure;

clamping means for securing the wheel to the main shaft such that the wheel rotates about an axis of rotation;

at least one contactless sensor device configured to measure the distance of a plurality of measurement points being scanned on the wheel with respect to a reference position;

a rotation sensor for determining the respective angular positions of the plurality of measurement points being scanned during the rotation of the wheel about the axis of rotation;

an evaluation device, connected to the at least one contactless sensor device and to the rotation sensor, that is configured to determine the position of the plurality of points, with respect to the axis of rotation, on the basis of the respective distances with respect to the reference position and of the respective angular positions with respect to the axis of rotation, wherein the at least one sensor device comprises a radar system.

9. The apparatus as claimed in claim 8, wherein the radar system operates at frequencies between 300 MHz and 300 Ghz.

10. The apparatus as claimed in claim 9, wherein the radar system is a millimeter-wave radar system and operates at frequencies between 30 GHz and 300 GHZ.

11. The apparatus as claimed in claim 10, wherein the radar system operates at frequencies between 76 GHz and 81 GHz.

12. The apparatus as claimed in claim 8, comprising at least three contactless sensor devices respectively facing an internal side of the wheel, an external side of the wheel, and a circumferential edge of the wheel.

13. The apparatus as claimed in claim 8, wherein the apparatus forms part of a tire changer.

14. The apparatus as claimed in claim 8, wherein the apparatus forms part of a wheel balancer.

15. The apparatus as claimed in claim 8, wherein the apparatus forms part of a vehicle brake tester.

* * * * *